(12) United States Patent
Kutsch et al.

(10) Patent No.: US 11,101,047 B2
(45) Date of Patent: Aug. 24, 2021

(54) POWER PLANT SYSTEM

(71) Applicant: TERRESTRIAL ENERGY USA, Inc., New York, NY (US)

(72) Inventors: John H. Kutsch, Harvard, IL (US); Anthonius Cornelis Rodenburg, Uitgeest (NL)

(73) Assignee: Terrestrial Energy USA, Inc., Charlotte, NC (US)

(*) Notice: Subject to any disclaimer, the term of this patent is extended or adjusted under 35 U.S.C. 154(b) by 78 days.

(21) Appl. No.: 16/578,364

(22) Filed: Sep. 22, 2019

(65) Prior Publication Data

US 2020/0135345 A1    Apr. 30, 2020

Related U.S. Application Data

(60) Provisional application No. 62/753,603, filed on Oct. 31, 2018.

(51) Int. Cl.
*G21C 3/54* (2006.01)
*G21C 1/22* (2006.01)
(Continued)

(52) U.S. Cl.
CPC .............. *G21C 3/54* (2013.01); *F03G 6/065* (2013.01); *F28D 20/0039* (2013.01); *G21C 1/22* (2013.01);
(Continued)

(58) Field of Classification Search
CPC . G21C 1/324; G21C 1/22; G21C 3/54; G21D 5/06; G21D 9/00; G21D 1/00;
(Continued)

(56) References Cited

U.S. PATENT DOCUMENTS

| | | |
|---|---|---|
| 3,517,151 A | 6/1970 | Mekjean |
| 8,739,512 B2 | 6/2014 | Mills |

(Continued)

FOREIGN PATENT DOCUMENTS

| | | |
|---|---|---|
| RU | 2424587 C1 | 7/2011 |
| RU | 2529638 C1 | 9/2014 |
| RU | 2014115465 A | 10/2015 |

OTHER PUBLICATIONS

Laurent, S. J. (2000). Thermocline thermal storage test for large-scale solar thermal power plants (No. SAND2000-2059C). Sandia National Labs., Albuquerque, NM (US); Sandia National Labs., Livermore, CA (US). (Year: 2000).*

*Primary Examiner* — Darlene M Ritchie
(74) *Attorney, Agent, or Firm* — Quarles & Brady LLP

(57) ABSTRACT

The power plant system includes a molten salt reactor assembly, a thermocline unit, phase change heat exchangers, and process heat systems. The thermocline unit includes an insulated tank, an initial inlet, a plurality of zone outlets, and a plurality of gradient zones corresponding to each zone outlet and being stacked in the tank. Each gradient zone has a molten salt portion at a portion temperature corresponding to the molten salt supply from the molten salt reactor being stored in the tank and stratified. The molten salt portions at higher portion temperatures generate thermal energy for process heat systems that require higher temperatures, and molten salt portions at lower portion temperatures generate thermal energy for process heat systems that require lower temperatures. The system continuously pumps the molten salt supply in controlled rates to deliver the heat exchange fluid supply to perform work in the corresponding particular process heat system.

7 Claims, 4 Drawing Sheets

(51) Int. Cl.
*F28D 20/00* (2006.01)
*G21D 9/00* (2006.01)
*G21D 5/06* (2006.01)
*G21C 1/32* (2006.01)
*F28D 20/02* (2006.01)
*F03G 6/06* (2006.01)

(52) U.S. Cl.
CPC ............... *G21D 5/06* (2013.01); *G21D 9/00* (2013.01); *F28D 20/021* (2013.01); *F28D 2020/0047* (2013.01); *F28D 2020/0078* (2013.01); *G21C 1/324* (2013.01); *Y02E 10/46* (2013.01); *Y02E 60/14* (2013.01)

(58) Field of Classification Search
CPC ............ F28D 20/0039; F28D 20/021; F28D 2020/0047; F28D 2020/0078; Y02E 30/00; Y02E 30/30; Y02E 10/46; Y02E 60/14; F03G 6/065; Y02A 20/212; C02F 2201/009
See application file for complete search history.

(56) References Cited

U.S. PATENT DOCUMENTS

| | | | |
|---|---|---|---|
| 8,955,320 B2 | 2/2015 | Xiang et al. | |
| 9,624,913 B2 | 4/2017 | Friesth | |
| 9,651,313 B2 | 5/2017 | Trainham et al. | |
| 2010/0319678 A1* | 12/2010 | Maemura | F24S 23/79 |
| | | | 126/570 |
| 2012/0100062 A1* | 4/2012 | Nakamura | C01B 3/042 |
| | | | 423/359 |
| 2012/0031941 A1 | 12/2012 | Ambrosek et al. | |
| 2014/0075939 A1* | 3/2014 | Aga | F03G 6/065 |
| | | | 60/641.11 |
| 2016/0217874 A1 | 7/2016 | Dewan et al. | |
| 2017/0261268 A1* | 9/2017 | Barmeier | F01K 3/00 |
| 2017/0363368 A1 | 12/2017 | Bergan et al. | |
| 2018/0024548 A1 | 8/2018 | Conlon | |
| 2019/0057783 A1* | 2/2019 | Leblanc | G21D 9/00 |
| 2020/0243208 A1* | 7/2020 | Negri | G21D 3/001 |

* cited by examiner

POWER PLANT SYSTEM

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a power plant system. More particularly, the present invention relates to a type of nuclear power plant, such as a nuclear power plant with a molten salt reactor. Even more particularly, the present invention relates to a system storing and converting the thermal energy from an integral molten salt reactor into usable energy. The present invention further relates to the method for storing and converting thermal energy.

2. Description of Related Art Including Information Disclosed Under 37 CFR 1.97 and 37 CFR 1.98

A nuclear power plant is a type of thermal power station with a nuclear reactor as the main heat source. In well-known applications, the heat from a controlled nuclear reaction creates steam that drives a generator to produce electricity. Other power plants for producing electricity from thermal energy include alternative energy sources, such as solar and wind. For these power plants creating thermal energy, the storage and conversion of thermal energy in terms of capacity, efficiency and utility have been limited to conventional heat exchangers and thermoclines. For some nuclear power plants, such as power plants based on a light water reactor (LWR), the amount of thermal energy is substantial and the temperatures are relatively low, which affects the efficiency for converting that thermal energy into work. For nuclear power plants with certain other nuclear reactors, the amount of thermal energy is substantial, and the temperatures are extremely high. A molten salt reactors (MSR), and in particular, an integral molten salt reactor (IMSR) generate this type of nuclear thermal energy, which can be used for higher level thermal processing, such as hydrolysis and ammonia production. Since the temperatures are well beyond the boiling point of water for steam generation, generating electricity is one of the lower functionalities of this type of nuclear thermal energy.

Conventional storage and conversion components are phase change heat exchangers and thermoclines. Various patents and patent applications have been published in the field of heat exchangers and thermoclines for power plants.

U.S. Pat. No. 8,739,512, issued to Mills on 3 Jun. 2014, discloses a solar power plant with the need for thermal energy storage due to the cyclical nature of the sun. A mediating thermal energy storage unit is part of the system, and both thermocline tanks and phase change storage units are disclosed as options for the mediating thermal energy storage unit.

US Patent Publication No. 2018/0245485, published for Conlon on 30 Aug. 2018, also discloses a method for generating electricity for a solar power plant. The inconsistency of the solar power generation requires solar heat energy to be storage as efficiently as possible for use during the night. The method discloses multiple thermocline tanks at different temperatures with regulated circulation based on heat differential for the task of electricity generation. U.S. Pat. No. 9,624,913, issued to Friesth on 18 Apr. 2017, discloses the multiple thermocline tanks for any renewable energy source (wind, solar, geothermal, etc.), not just a solar power plant.

US Patent Publication No. 2012/0319410, published for Ambrosek et al. on 20 Dec. 2012, discloses two phase change thermal storage modules. The interaction of the two modules is more specific with heat energy output between primary module and the secondary module. U.S. Pat. No. 8,955,320, issued to Xiang et al on 17 Feb. 2015, also describes a known phase change heat storage unit. The scope of the patent relates to the various controls on the thermal charging rate.

Other references treat phase change heat exchangers and thermocline units as somewhat interchangeable. U.S. Pat. No. 9,651,313, issued to Trainham et al. on 16 May 2017, teaches another system for a thermocline tank or a phase change storage unit. US Patent Publication No. 2017/0363368, published for Bergan et al. on 21 Dec. 2017, is another multiple tank system with a thermocline tank and a phase change storage unit treated as equal alternatives. It is recognized that all supporting components and several other controllers would need to be changed in order to actually substitute a thermocline and phase change heat exchangers. The heat storage systems may be interchangeable alternatives to thermal energy storage and conversion, but the physical components of actual systems are not simply "plug and go" interchangeable.

These prior art references and state of the art for thermal storage and conversion components do not address the particular capacity, efficiency, and utility of the thermal energy from a molten salt reactor.

It is an object of the present invention to provide a power plant system to accommodate the capacity of thermal energy from an integrated molten salt reactor.

It is an object of the present invention to provide a power plant system to efficiently store the thermal energy from an integrated molten salt reactor.

It is an object of the present invention to provide a power plant system to properly utilize the thermal energy from an integral molten salt reactor.

It is another object of the present invention to provide embodiments of a power plant system with a thermocline unit having gradient zones corresponding to stratified molten salt portions stored in the thermocline unit.

It is another object of the present invention to provide embodiments of a power plant system with phase change heat exchangers corresponding to each gradient zone and respective molten salt portion.

It is another object of the present invention to provide embodiments of a power plant system to deliver a heat exchange fluid supply to a process heat system.

It is still another object of the present invention to provide embodiments of a power plant system with phase change heat exchangers cooperative with each other and a respective process heat system in order to supply heat exchange fluid supply to a particular process heat system.

It is still another object of the present invention to provide embodiments of a power plant system with molten salt portions flowing continuously through the thermocline unit, according to energy demands of a particular process heat system.

It is still another object of the present invention to provide embodiments of a power plant system deliver a heat exchange fluid supply to a process heat system determined by the molten salt portion and an adjacent phase change heat exchanger.

It is yet another object of the present invention to provide embodiments of a power plant system to safely and efficiently compensate for dynamic changes in thermal energy surpluses and thermal energy demands from process heat systems.

These and other objectives and advantages of the present invention will become apparent from a reading of the attached specifications and appended claims.

BRIEF SUMMARY OF THE INVENTION

Embodiments of the present invention include a power plant system comprising a molten salt reactor assembly having a molten salt supply at a first temperature, a thermocline unit being in fluid connection with the molten salt reactor assembly, a plurality of phase change heat exchangers in fluid connection with the thermocline unit, and a plurality of process heat systems. The molten salt reactor assembly includes a molten salt outlet and a salt return line. The thermocline unit comprises an insulated tank with a top end and a bottom end, an initial inlet in fluid connection with the molten salt outlet of the molten salt reactor, a plurality of zone outlets arranged from the top end to the bottom end of the tank, and a plurality of gradient zones within the tank. Each zone outlet defines a corresponding gradient zone. The gradient zones can be stacked from the bottom end to the top end of the tank. Each gradient zone can have a molten salt portion at a portion temperature. The gradient zones of the tank correspond to the heat boundaries between stratified molten salt portions of the molten salt supply within the thermocline. These molten salt portions separate by density so multiple heat boundaries are formed and store different thermal energy in each molten salt portion at the corresponding portion temperatures.

The present invention includes each phase change heat exchanger being in fluid connection with a corresponding outlet, a corresponding gradient zone and an adjacent phase change heat exchanger. Each phase change heat exchanger includes a salt intake in fluid connection with a corresponding zone outlet, a salt outlet in fluid connection with the salt return line of the molten salt reactor assembly, and a heat exchange fluid supply in heat exchange relationship with a corresponding molten salt portion of the corresponding gradient zone. In some embodiments, the heat exchange fluid supply is also in fluid connection with the adjacent phase change heat exchanger. Thermal energy can be transferred between phase change heat exchangers so that the power plant system can isolate thermal energy at a particular portion temperature for use by a process heat system or control the division of thermal energy to more than one portion temperatures for use by two different process heat systems.

Each process heat system is in fluid connection with at least one phase change heat exchanger. The process heat systems receive useful thermal energy at the portion temperature appropriate for the process. For example, the power plant system can provide thermal energy at the higher portion temperature for a process heat system for hydrolysis and thermal energy at a lower portion temperature for a process heat system for electricity generation. The thermal energy is managed so that the amount and high temperature molten salt supply at the first temperature from an integral molten salt reactor (IMSR) is not the only heat exchange relationship to the process heat systems. The molten salt supply of the IMSR can be efficiently stored and converted to useful thermal energy for more than one process heat system.

Embodiments of the present invention include a method for storing and converting thermal energy. The method includes generating a molten salt supply at a first temperature from a molten salt reactor assembly and flowing or pumping the molten salt supply to a thermocline unit. The molten salt supply stratifies within the thermocline unit so as to form a plurality of molten salt portions in layers. Each molten salt portion has a portion temperature and corresponds to a gradient zone of the thermocline unit. Each portion temperature of a corresponding gradient zone is higher than a respective portion temperature of the respective gradient zone stacked under the corresponding gradient zone. The method also includes flowing or transferring the molten salt portions in respective gradient zones through respective zone outlets to a plurality of phase change heat exchangers. Each phase change heat exchanger is in fluid connection with an adjacent phase change heat exchanger and the molten salt reactor through the respective gradient zone. At least one operative thermal energy supply is generated from the plurality of phase change heat exchangers and the molten salt portions. The at least one operative thermal energy supply is delivered to at least one process heat system in fluid connection with a corresponding phase change heat exchanger. The process heat system receives useable thermal energy for the particular functionality of the process heat system, even if the molten salt supply from the IMSR had a much higher first temperature than the portion temperature corresponding to the at least one operative thermal energy supply.

In some embodiments, the method includes generating more than one operative thermal energy supply. A first phase change heat exchanger and a second phase change heat exchanger generate a first operative thermal energy supply and a second thermal energy supply, respectively. These two different thermal energy supplies can represent a supply for ammonia production as a first process heat system and a supply for electricity generation as a second process heat system. Both process heat systems can efficiently and concurrently receive useable thermal energy for the two functionalities, even if the molten salt supply from the IMSR had a much higher first temperature than the portion temperature corresponding to the first operative thermal energy supply or the second operative thermal energy supply. An additional phase change heat exchanger can generate an additional operative thermal energy supply for an additional process heat system. The method can incorporate multiple operative thermal energy supplies from the single molten salt supply.

DETAILED DESCRIPTION OF THE INVENTION

The thermal energy from an integral molten salt reactor (IMSR) requires consideration of the amount of thermal energy and extremely high temperatures of the molten salt supply generated by the IMSR. Conventional thermoclines have the storage capacity for the amount of thermal energy, but the thermal energy become less useful, especially for high temperature process heat system or high temperature differential process heat systems. When storing so much thermal energy, the thermal energy is stored at a temperature that reduces the functionality of the high heat from the IMSR. Conventional phase change heat exchangers have the efficiency to convert the thermal energy at the higher temperatures, but the phase change is so dynamic that the storage capacity if very low. The present invention comprises a nuclear power plant system 10 and method for thermal energy to address the specific considerations of molten salt reactors, and IMSRs particularly.

Figure 1:
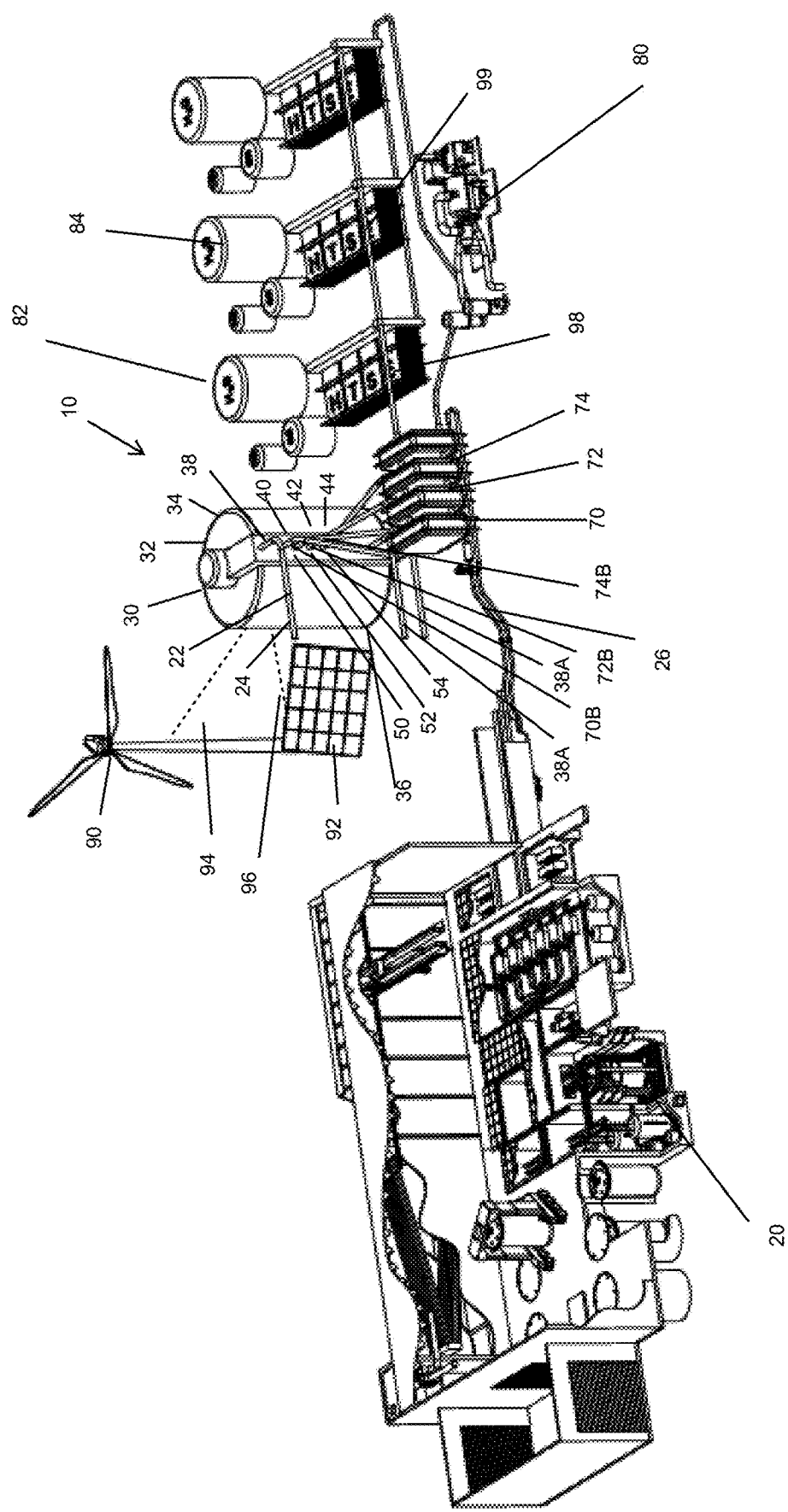
FIG. 1 is a front schematic view of an embodiment of the power plant system according to the present invention.
Figure 2:
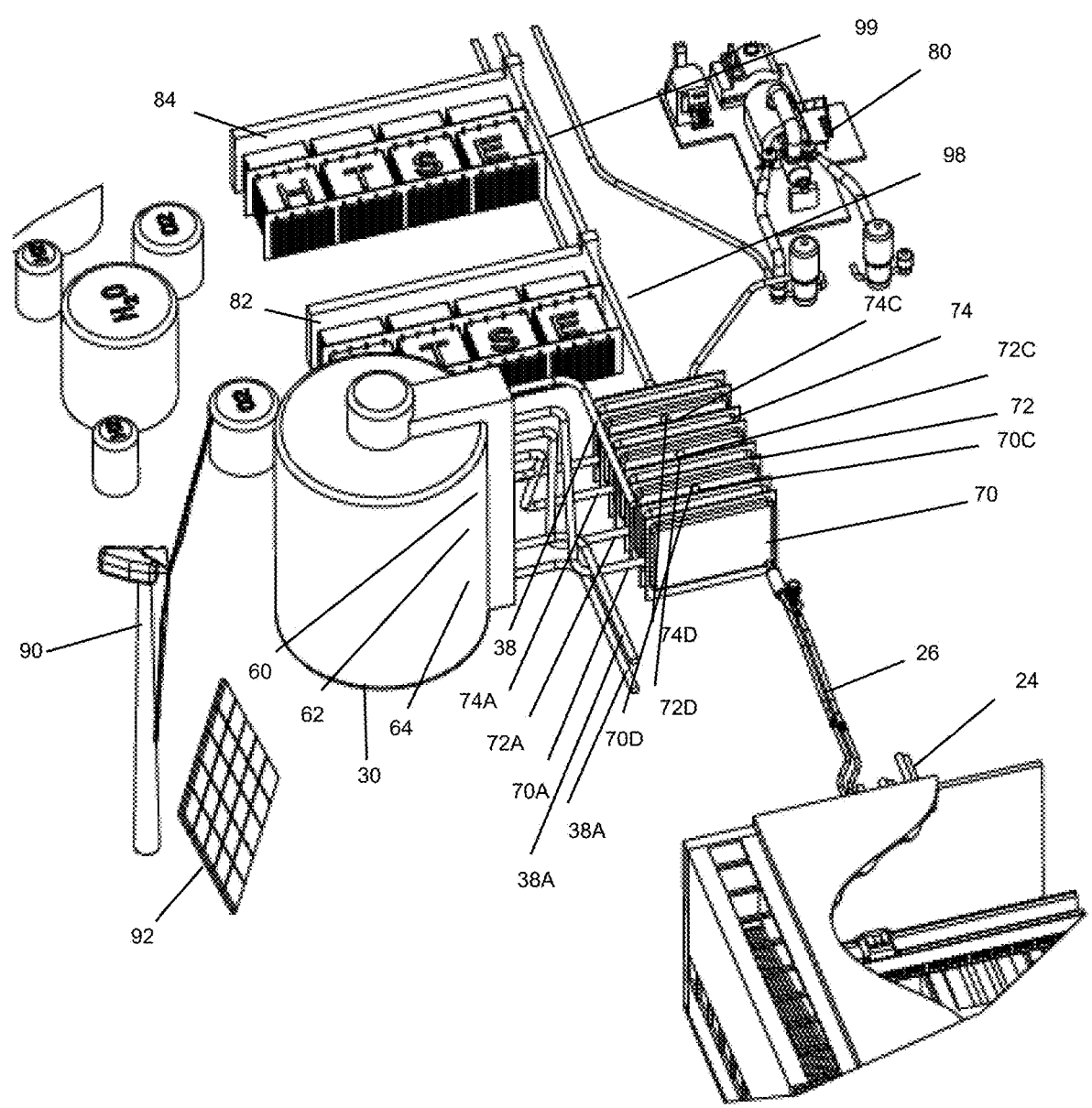
FIG. 2 is a back schematic view of the embodiment of FIG. 1, showing another side of the thermocline unit.
Figure 5:
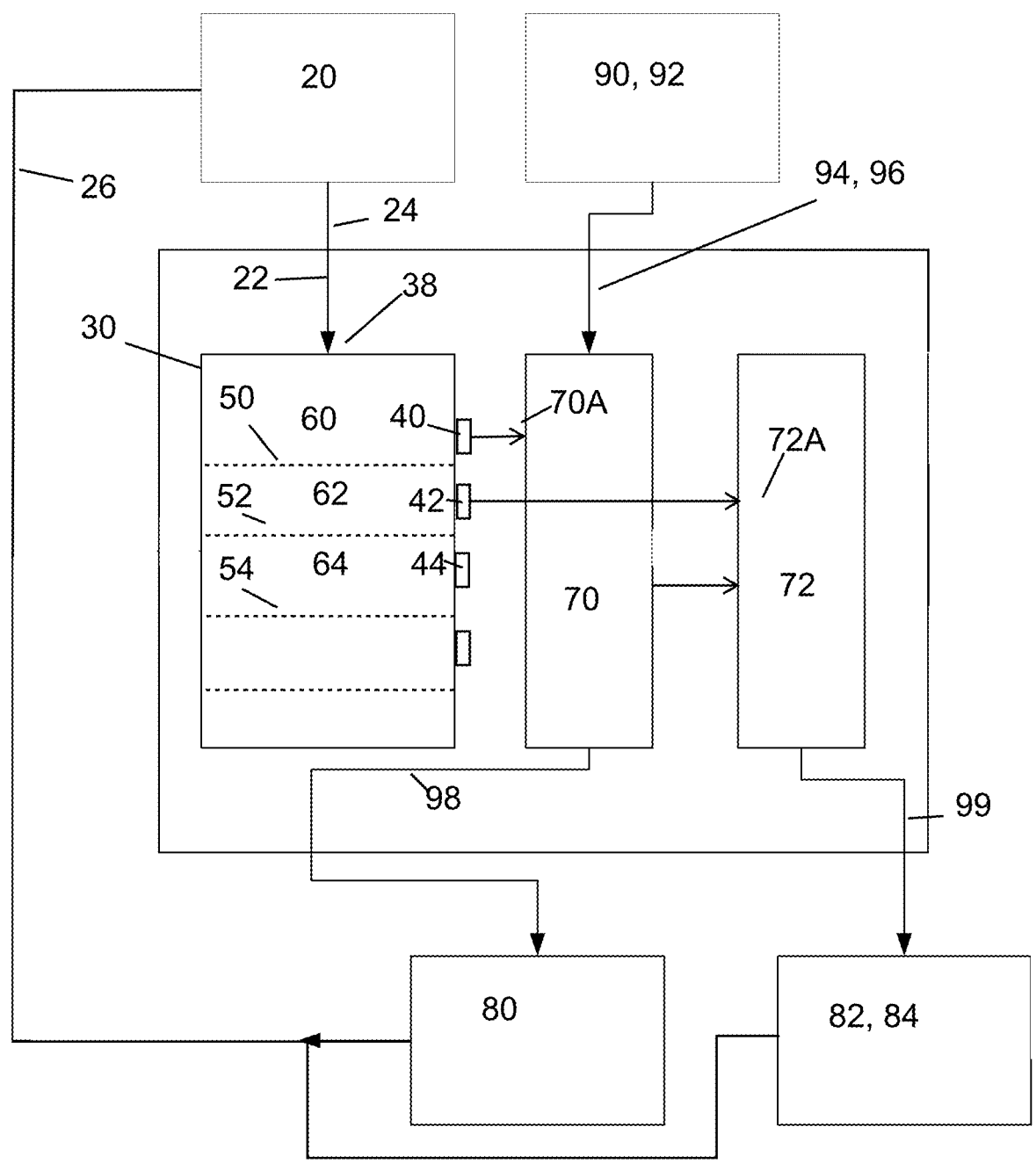
FIG. 5 is a flow chart illustration of the power plant system and method for thermal energy according to the present invention.

Referring to FIGS. 1, 2, and 5, an embodiment of the power plant system 10 comprises a molten salt reactor assembly 20 having a molten salt supply 22 at a first temperature, a thermocline unit 30 being in fluid connection with the molten salt reactor, a plurality of phase change heat exchangers, 70, 72, 74 being in fluid connection with the thermocline 30, and a plurality of process heat systems, 80, 82 84 being in fluid connection with at least one phase change heat exchanger 70, 72, 74.

The molten salt reactor assembly 20 can be comprised of a molten salt outlet 24 and a salt return line 26. The molten salt reactor assembly 20 includes the molten salt reactor with nuclear molten salt or fuel salt. Nuclear molten salt or fuel salt is the salt with nuclear fuel, such as uranium tetrafluoride, and the nuclear molten salt or fuel salt never actually leaves the molten salt reactor assembly 20 due to health and safety concerns. There can be manifolds and secondary heat exchangers in the molten salt reactor assembly 20 to treat these nuclear aspects of the molten salt reactor or IMSR. These components are known in the prior art as background information, and these components can use coolant salts to manage the nuclear fuel and heat from the fuel salt. Different heat exchange loops of coolant salts in the molten salt reactor assembly 20 can considered parts of the molten salt reactor assembly 20. For the present invention, the molten salt reactor assembly 20 has a molten salt supply 22 or working salt at the first temperature at the molten salt outlet 24. The molten salt supply 22 or working salt is not radioactive and is not the direct nuclear molten salt or fuel salt from a reactor. In practice, the molten salt supply 22 or working salt at the molten salt outlet 24 is at approximately 600 degrees C., and the molten salt supply 22 or working salt is most often in a heat exchange relationship with a coolant salt of the molten salt reactor assembly 20. The molten salt supply 22 or working salt is not in contact with the nuclear fuel of the fuel salt. As known in the prior art, the molten salt reactor assembly 20 can include a reactor and other components for removing the radioactivity. For the present invention, the molten salt reactor assembly 20 includes the molten salt inlet 22 and the molten salt outlet 24. The molten salt supply 22 in fluid connection with the thermocline unit 30 is not radioactive and may be the result of one or two other heat exchange relationships and manifold interactions that transform the nuclear thermal energy into another thermal energy to be stored or processed or both.

The molten salt in the salt return line 26 is at a temperature lower than the first temperature. The molten salt in the return line 26 can be reused to cool further nuclear reactions and be reheated back into the molten salt supply 22 at the first temperature through the molten salt outlet 24. The molten salt reactor assembly 20 can be comprised of an integral molten salt reactor (IMSR). The more compact and replaceable IMSR is one embodiment of the power plant system 10 of the present invention. The molten salt reactor assembly 20 can be an IMSR with core units and other components and connections for the nuclear reaction as shown in FIGS. 1 and 2. In some embodiments, the molten salt supply 22 or working salt is comprised of carrier salts, such as nitrates and chlorides. In contrast, the nuclear fuel in the nuclear molten salt or fuel salt may be uranium tetrafluoride, which cannot safely leave the molten salt reactor assembly 20. The tritium in the nuclear molten salt or fuel salt from the nuclear reaction must be removed, and other components in the molten salt reactor assembly 20 can perform this removal, such as heat exchange loops with coolant salt. The carrier salts, or working salt, can leave the molten salt reactor assembly 20 and can be selected from a group consisting of fluoride salts. Other families of salts can be selected, such as three different chloride salts, beryllium, potassium, and even zirconium can also be considered. In the present invention, the molten salt supply 22 is a mixture with different densities. There are at least two different molten salts in the molten salt supply 22 or working salt so that there are at least two densities. The molten salt supply 22 must be able to separate into different layers by density.

An embodiment of the thermocline unit 30 comprises an insulated tank 32 with a top end 34 and a bottom end 36, an initial inlet 38 in fluid connection with the molten salt outlet of the molten salt reactor, a plurality of zone outlets 40, 42, 44 arranged from the top end 34 to the bottom end 36 of the insulated tank 32, and a plurality of gradient zones 50, 52, 54 within the insulated tank 32. The insulated tank 32 can include conventional components inside as well, such as graphite or sand heat sinks as dense matter to absorb additional heat. Regular thermocline components are known in the prior art.

The insulated tank 32 can be generally cylindrical with the initial inlet 38 at or near the top end 34. The molten salt supply 22 enters the insulated tank 32 through the initial inlet 38 and must settle in the insulated tank 32. The zone outlets 40, 42, 44 are dispersed between the top end 34 and the bottom end 36. The zone outlets 40, 42, 44 may be linearly arranged or offset from each other, but the zone outlets 40, 42, 44 must be positioned at different distances from the top end 34 of the insulated tank 32. Each zone outlet 40, 42, 44 defines a corresponding gradient zone 50, 52, 54. These gradient zones 50, 52, 54 are stacked between the top end 34 and the bottom end 36 according to the different distances from the top end 34 of the insulated tank 32 of the zone outlets 40, 42, 44.

Each gradient zone 50, 52, 54 has a molten salt portion 60, 62, 64 at a portion temperature. As the molten salt supply 22 settles in the insulated tank 32. The molten salt portions 60, 62, 64 form into stratified layers. The molten salt supply 22 is comprised of different salts with different densities; thus, the insulated tank 32 allows the molten salt supply 22 to separate into these different portions. There are heat boundaries between adjacent molten salt portions 60, 62, 64 functioning as conventional heat boundaries of regular thermoclines. In the present invention, the thermocline unit 30 has components to account for the multiple heat boundaries and the different molten salt portions 60, 62, 64 separated and insulated by the multiple heat boundaries.

Each portion temperature of a corresponding gradient zone 50, 52, 54 is higher than a respective portion temperature of the respective gradient zone 50, 52, 54 stacked under the corresponding gradient zone 50, 52, 54. In FIG. 5 as an example, molten salt portion 62 in gradient zone 52 has a portion temperature lower than molten salt portion 60 in gradient zone 50 and higher than molten salt portion 64 in gradient zone 54. The gradient zones 50, 52, 54 may be adjusted by placement of the corresponding zone outlets 40, 42, 44 so as to match the stratifying of the molten salt supply 22 into the molten salt portions 60, 62, 64 as layers.

In one embodiment, the initial inlet 38 of the thermocline unit 30 is connected to the top end 34 of the insulated tank 32 so as to define a top zone outlet 40 adjacent the top end 34 of the insulated tank 32 and a corresponding top gradient zone 50 with a top molten salt portion 60 at a top portion temperature, as shown in FIGS. 2 and 5. FIGS. 1-2 also show additional inlets 38A near the bottom end 36 of the insulated tank 32 and between the bottom end 36 and the top end 34 of the insulated tank 32. There can be multiple inlets 38, 38A, 38A in order for more than one fluid connection to the thermocline unit 30. The molten salt supply 22 must have time to settle, so injecting at multiple levels in the insulated tank 32 is one embodiment of the present invention. The initial inlet 38 at the top end 34 is only one embodiment of the present invention. The first temperature of the molten salt supply 22 remains higher than the top portion temperature of the top molten salt portion 60, but the portion temperatures of the molten salt portions 62, 64 below the top molten salt portion 60 lower toward the bottom end 36 of the insulated tank 32.

In some embodiments, each phase change heat exchanger 70, 72, 74 is in fluid connection with a corresponding zone outlet 40, 42, 44 and a corresponding gradient zone 50, 52, 54. FIGS. 1, 2, and 5 show that each phase change heat exchanger 70, 72, 74 is in fluid connection with an adjacent phase change heat exchanger 72, 74, 70 and the molten salt reactor assembly 20, specifically through the corresponding zone outlet 40, 42, 44 of the thermocline unit 30 and the initial inlet 38 of the thermocline unit 30.

FIGS. 1, 2, and 5 also show that each phase change heat exchanger 70, 72, 74 comprises a salt intake 70A, 72A, 74A in fluid connection with a corresponding zone outlet, 40, 42, 44, a salt outlet 70B, 72B, 74B in fluid connection with the salt return line 26 of the molten salt reactor assembly 20, and a heat exchange fluid supply 70C, 72C, 74C in heat exchange relationship with a corresponding molten salt portion 60, 62, 64 of the corresponding gradient zone 50, 52, 54.

Embodiments of the present invention include the heat exchange fluid supply 70C, 72C, 74C being in fluid connection with the adjacent phase change heat exchanger 72, 74, 70. Thermal energy can pass between the phase change heat exchangers 70, 72, 74 for a cooperative effect. For example, if there is a demand for thermal energy at the portion temperature corresponding to molten salt portion 62, then thermal energy of molten salt portion 60 can be transferred to the phase change heat exchanger 72 through the phase change heat exchanger 70. The higher temperature of the molten salt portion 60 can still be useful for the demand at the different temperature.

FIGS. 1 and 2 show each heat exchange fluid supply comprised of a working molten salt supply 70D, 72D, 74D. The heat exchange relationship in each phase change heat exchanger 70, 72, 74 can be between the respective molten salt portions 60, 62, 64 and a separate heat exchange fluid, such as a working molten salt supply 70D, 72D, 74D. The working molten salt supply 70D, 72D, 74D passes thermal energy to the process heat systems 80, 82, 84 in a separate loop from the molten salt supply 22, the molten salt portions 60, 62, 64, and the return line 26 to the molten salt reactor assembly 20 as in FIG. 5. There can be other conventional components in the phase change heat exchangers 70, 72, 74, such as other heat exchange fluids transferring heat between the molten salt portions 60, 62, 64 and the eventual working molten salt supplies 70D, 72D, 74D.

The working molten salt supply 70D, 72D, 74D is never the same as the molten salt supply 22, the molten salt portions 60, 62, 64, and the return line 26. FIG. 1 shows the embodiments with a single loop from the molten salt supply 22, the molten salt portions 60, 62, 64, the phase change heat exchangers 70, 72, 74, and the return line 26. There is a loop to return the molten salt back into the molten salt reactor assembly 20 after the thermal energy is used from the molten salt supply 22 at the first temperature. The molten salt supply 22 or working salt is closer to the radioactivity in the molten salt reactor assembly 20, so this molten salt supply 22 is never pumped out and transported through the power plant as part of the inherent safety of the overall IMSR system.

The working molten salt supplies 70D, 72D, 74D are sealed from the molten salt supply 22 and are not in fluid connection with the molten salt supply 22. The working molten salt supplies 70D, 72D, 74D are in heat exchange relationship to the corresponding molten salt portions 60, 62, 64 of the molten salt supply 22. The working molten salt supplies 70D, 72D, 74D can also be comprised of carrier salts, such as nitrates, chlorides and fluorides. There is no nuclear component of these working molten salt supplies 70D, 72D, 74D, but other families of salts can also be selected. There is no mixture or multiple density requirement for the working molten salt supplies 70D, 72D, 74D.

Figure 3:
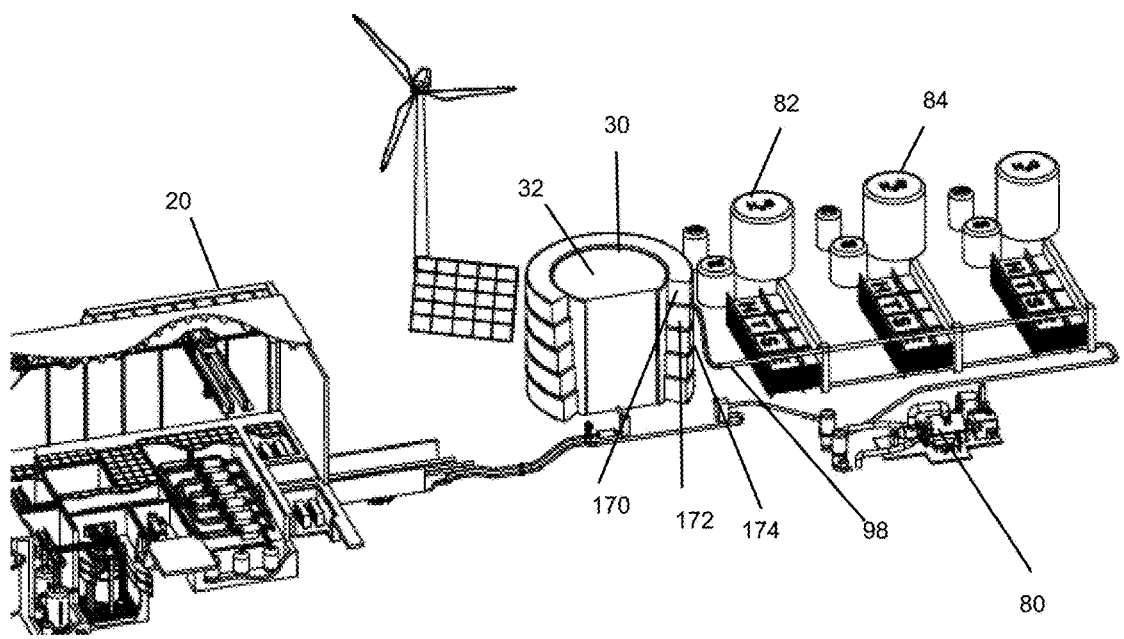
FIG. 3 is a partial front schematic view of a first alternate embodiment of the power plant system with stacked phase change heat exchangers around the thermocline unit.
Figure 4:
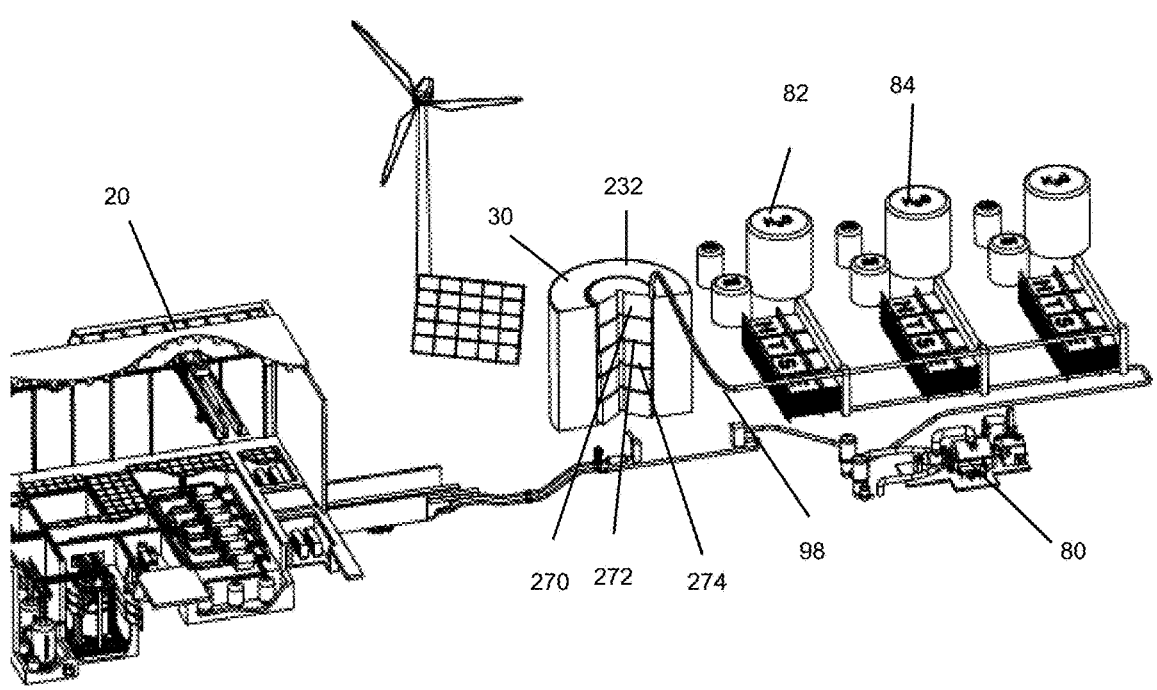
FIG. 4 is a partial front schematic view of a second alternate embodiment of the power plant system with the thermocline unit having a ring tank around stacked phase change heat exchangers.

FIGS. 3 and 4 show different embodiments of the plurality of phase change heat exchangers 70, 72, 74, 170, 172, 174, 270, 272, 274. FIGS. 1 and 2 show the phase change heat exchangers 70, 72, 74, arranged in an array. The phase change heat exchangers 70, 72, 74, can be separate stand-alone units with standard piping, pump, and valve connections. The phase change heat exchanger 70, 72, 74, are not in any physical contact with the thermocline unit 30. FIG. 3 shows another embodiment of the phase change heat exchangers 170, 172, 174, in a stack around the insulated tank 32. The zone outlets of the thermocline unit, the salt intakes of the phase change heat exchangers 170, 172, 174, the salt outlets of the phase change heat exchangers 170, 172, 174, and the heat exchange fluid supplies of phase change heat exchangers 170, 172, 174, are not shown in detail. Standard piping, pump, and valve connections comprised these components known to one with ordinary skill in the art. In the stacked configuration, these components can be closer together for more efficient heat exchange relationships and less waste heat through piping.

FIG. 4 shows a further alternative embodiment with the tank of the thermocline unit 30 being comprised of a ring tank 232 defining a center area 233. In this embodiment, the plurality of phase change heat exchangers 270, 272, 274 are stacked within the center area 233 of the ring tank 232. The zone outlets of the thermocline unit, the salt intakes of the phase change heat exchangers 170, 172, 174, the salt outlets of the phase change heat exchangers 270, 272, 274, and the heat exchange fluid supplies of phase change heat exchangers 270, 272, 274, are also not shown in detail. Standard piping, pump, and valve connections comprised these components known to one with ordinary skill in the art. In the stacked configuration for the ring tank 232, these components can also be closer together for more efficient heat exchange relationships and even less waste heat through piping. Especially with the thermocline unit 232 around the phase change heat exchangers 270, 272, 274, there is a greater reduction of waste heat.

FIGS. 1, 3 and 4 show schematic views of the process heat systems 80, 82, 84 of the present invention. The plurality of process heat systems 80, 82, 84 can be a desalination system 84, a hydrogen production system 82, such as a high temperature steam electrolysis (HTSE) system, or an electricity generation system 80. A process heat system 80, 82, 84 refers to any apparatus that uses thermal energy. The power plant system 10 controls thermal energy from an IMSR to be stored, converted and distributed efficiently to any process heat system 80, 82, 84. Process heat systems 80, 82, 84 have different thermal energy requirements, in terms of temperature and amount. The power plant system 10 allows for providing efficient thermal energy at the desired temperature, even if lower and even if higher for super heating for some process heat systems.

Additional embodiments are shown FIGS. 1-5 with a secondary thermal energy system 90, 92 having a thermal energy supply 94, 96 at a secondary temperature and being in a heat exchange relationship with the thermocline unit 30. The power plant system 10 is not limited to a molten salt reactor assembly 20 as the only thermal energy source. Additional thermal energy systems 90, 92 are schematically shown. The secondary thermal energy system 90, 92 can be in heat exchange relationship with at least one heat exchange fluid supply 70C, 72C, 74C. In particular, there is a heat exchange relationship with the corresponding phase change heat exchanger 70, 72, 74 with a corresponding gradient zone of the thermocline unit 30 having a respective molten salt portion at a respective portion temperature. When the respective portion temperature is lower than the secondary temperature, the secondary thermal energy system 90, 92 transfers thermal energy into the heat exchange fluid supply 70C, 72C, 74C to be used by the process heat systems 80, 82, 84. The secondary thermal energy system 90, 92 is independent from the molten salt supply 22 from the molten salt reactor assembly 20. The secondary thermal energy system 90, 92 is an alternative embodiment to salvage thermal energy from these alternative energy sources. Other connections to transfer thermal energy from the second thermal energy systems 90, 92 are also possible.

FIGS. 1-5 show the secondary thermal energy system as a wind power generator 90 and/or a solar power generator 92. There is a particular compatibility of the power plant system 10 and these alternative energy sources. For example, with a solar power generator 92, there is inconsistent sunlight due to nighttime. The low level of thermal energy during the nighttime is not useful for process heat systems 80, 82, 84. However, as a contributor to the power plant system 10 of the present invention, the previously waste thermal energy can now be used. Similarly, when the wind is not blowing, a wind power generator 90 can still produce useful thermal energy that was previously wasted without a conversion for process heat systems 80, 82, 84.

The present invention includes the method of using the power plant system 10 for thermal energy, in particular, storing and converting thermal energy from an IMSR. FIG. 5 illustrates the embodiment of the method. A molten salt supply 22 at a first temperature is generated from a molten salt reactor assembly 20. That molten salt reactor assembly 20 can include an IMSR or other salt reactor. The molten salt supply 22 at the first temperature is very hot and leaves the molten salt reactor assembly 20 through a molten salt outlet 24. In some embodiments, the first temperature can be around 650 degrees Celsius. Used molten salt returns to the molten salt reactor assembly 20 through a salt return line 26 for recycling the molten salt. After leaving the molten salt reactor assembly 20, the molten salt supply 22 flows to a thermocline unit 30 being in fluid connection with the molten salt reactor assembly 20. The step of flowing can be pumping or any other known method for transporting molten salt. There may be natural circulation forces or even pumps. The thermocline unit 30 of the method is the thermocline unit 30 of FIGS. 1-2 with the insulated tank 32 with a top end 34 and a bottom end 36, the initial inlet 38 in fluid connection with the molten salt outlet 24 of the molten salt reactor assembly 20, the plurality of zone outlets 40, 42, 44 arranged from the top end 34 to the bottom end 36 of the insulated tank 32, and the plurality of gradient zones 50, 52, 54 within the insulated tank 32. Each zone outlet 40, 42, 44 define a corresponding gradient zone, 50, 52, 54, and the gradient zones 50, 52, 54 are stacked between the top end 34 and the bottom end 36. In this thermocline unit 30, the method includes stratifying the molten salt supply 22 within the insulated tank 32 of the thermocline unit 30 so as to form a plurality of molten salt portions, 60, 62, 64. Each molten salt portion 60, 62, 64 has a portion temperature and a corresponding gradient zone, 50, 52, 54.

The step of stratifying creates multiple heat boundaries between the molten salt portions 60, 62, 64. These heat boundaries insulate the layers of molten salt portions 60, 62, 64 from each other, just as a conventional or even naturally occurring thermocline lake stores thermal energy at different layers of water. In the present invention, the method includes stratifying the molten salt supply 22, including stratifying by density due to the different salts in the mixture. Once separated by density, the molten salt supply 22 is also separated by temperatures, resulting in each molten salt portion 60, 62, 64 at a respective portion temperature. In one embodiment, each portion temperature of the molten salt portion in a corresponding gradient zone is higher than a respective portion temperature of the respective molten salt portion in the gradient zone stacked under the corresponding gradient zone.

The method further includes flowing the molten salt portions 60, 62, 64 in respective gradient zones 50, 52, 54 through respective zone outlets 40, 42, 44 to a plurality of phase change heat exchangers, 70, 72, 74. These phase change heat exchangers 70, 72, 74 are the phase change heat exchangers of FIGS. 1-2. Each phase change heat exchanger 70, 72, 74 is in fluid connection with an adjacent phase change heat exchanger 72, 74, 70, and the molten salt reactor assembly 20 (through the thermocline unit 30). The molten salt supply 22 is recycled back to the molten salt reactor assembly 20 from the phase change heat exchangers 70, 72, 74 through the salt return line 26. The molten salt supply 22 can be re-heated through known components, such as manifolds and other heat exchanger interacting with the nuclear reactor and nuclear molten salt. No radioactive or nuclear salt is used to leave the molten salt reactor assembly 20 in the present invention.

Embodiments of the method further include generating at least one operative thermal energy supply 98, 99 from the plurality of phase change heat exchangers 70, 72, 74 and the molten salt portions 60, 62, 64. An operative thermal energy supply 98, 99 is a useable thermal energy supply for a process heat system 80, 82, 84. The operative thermal energy 98, 99 is more efficient for the selected process heat system 80, 82, 84 than the raw thermal energy from the molten salt supply 22 directly from the molten salt reactor assembly 20. The term "operative" means that the thermal energy 98, 99 is more efficient and more compatible than the raw thermal energy. The operative thermal energy 98, 99 may be at a lower temperature than the first temperature of the molten salt supply 22 for process heat systems, 80, like electricity generators. But the operative thermal energy 98, 99 may also be at a higher temperature than the first temperature of the molten salt supply 22 for other process heat systems that require super-heating or "topping" heat systems. Some high temperature steam electrolysis (HTSE) can use the super-heated heat exchange fluid supply.

Embodiments of the method also include delivering at least one operative thermal energy supply 98, 99 to at least one process heat system 80, 82, 84 in fluid connection with a corresponding phase change heat exchanger 70, 72, 74. The step of delivering is similar to the step of flowing. The step of delivering includes any prior art method for transferring thermal energy from the heat exchange fluid supplies 70C, 72C, 74C. For example, the activity may be pumping the heat exchange fluid supply 70C, 72C, 74C to an electricity generator 80, that is a steam generator to spin a turbine for electricity. The heat exchange fluid supply 70C, 72C, 74C of each phase change heat exchanger 70, 72, 74 is sealed relative to the molten salt supply 22. There is no fluid connection of the molten salt supply 22 for direct pumping to a process heat system 80, 82, 84. The molten salt supply 22 interacts closer to the nuclear components and does not have a circulation loop beyond the phase change heat exchangers 70, 72, 74. The heat exchange fluid supply 70C, 72C, 74C may further interact with other heat exchangers as controlled by the power plant system 10. For example, the heat exchange fluid supply 72C can deliver an operative thermal energy supply to a hydrogen production system as the process heat system 82. The heat exchange fluid supply 72C may still have useful thermal energy for a lower level temperature. Thus, the heat exchange fluid supply 72C can also deliver an operative thermal energy supply to the steam generator of an electricity generator as a process heat system 80. This heat exchange fluid supply 72C is recycled back to the corresponding phase change heat exchanger 72 to be recharged for more work delivering another operative thermal energy supply.

One alternate embodiment of the invention includes the step of generating comprising generating a first operative thermal energy supply 98 from one of the plurality of phase change heat exchangers 70 and a corresponding molten salt portion 60, and generating a second operative thermal energy supply 99 from another of the plurality of phase change heat exchangers 72 and another corresponding molten salt portion 62. The molten salt supply 22 can have such a high thermal energy than more than one operative thermal energy supply 98, 99 can be formed with the power plant system 10. In this embodiment, the step of delivering comprises delivering the first operative thermal energy supply 98 to a first process heat system 82 in fluid connection with the one of the plurality of phase change heat exchangers 72, and delivering the second operative thermal energy supply 99 to a second process heat system 84 in fluid connection with the another of the plurality of phase change heat exchangers 74. The large capacity and high temperature of the molten salt supply 22 can power more than one process heat system 80, 82, 84, even with those process heat systems 80, 82, 84 requiring different molten salt portions 60, 62 at different temperatures for more efficiency relative to the raw thermal energy of the molten salt supply 22.

In another alternative embodiment, the phase change heat exchangers 70, 72, 74 are cooperative. When one process heat system, such as hydrogen production as process heat system 72, has an increased demand for thermal energy, the other process heat systems 70, 74 can lower or even stop drawing on their respective operative thermal energy so that more thermal energy can be devoted to the hydrogen production as the process heat system 72. In that embodiment of the method, the step of delivering comprises delivering the first operative thermal energy supply 98 to the another of the plurality of phase change heat exchangers 72. Then, the step of generating comprises generating a second operative thermal energy supply 99 from another of the plurality of phase change heat exchangers 74 and another corresponding molten salt portion 64 and from the first operative thermal energy supply 98. In the example, the thermal energy for the process heat system 82 can be re-directed to the hydrogen production linked to the second operative thermal energy at phase change heat exchanger 74.

In still another alternative embodiment, the method of the present invention addresses the capacity concerns for the molten salt supply 22 from the IMSR as the molten salt reactor assembly 20. In the method, the step of flowing the molten salt portions 60, 62, 64 in respective gradient zones 50, 52, 54 through respective zone outlets 40, 42, 44 to a plurality of phase change heat exchangers 70, 72, 74, and the step of generating at least one operative thermal energy supply 98, 99 from the plurality of phase change heat exchangers and the molten salt portions, are continuous. The power plant system 10 can be in constant operation and always flowing the molten salt supply 22. There is no ramping up, and there is no wait time for the heat exchange fluid to charge or cool. There is less thermal stress, especially in comparison to the prior art phase change heat exchangers at the higher temperatures with a sudden and dynamic phase change. The method of the present invention with the power plant system 10 has a greater capacity to store thermal energy with the molten salt portions contributing and cooperating between portion temperatures. In this embodiment, the method further includes adjusting rates of the step of flowing and the step of generating for respective phase change heat exchangers. Although the rates may slow, the rates do not stop. One rate may increase due to demand of the process heat system, while other rates decrease.

In yet another alternative embodiment, the method of the present invention is compatible with other alternative energy sources. The method can include the step of supplying a thermal energy supply 94, 96 at a secondary temperature in a heat exchange relationship with at least one of the phase change heat exchangers 70, 72, 74. The secondary thermal energy system 90, 92 can be in heat exchange relationship with a corresponding heat exchange fluid supply 70C, 72C, 74C having a corresponding gradient zone 50, 52, 54 of the thermocline unit 30 and a respective salt portion at a respective portion temperature. The thermal energy supply 94, 96 is in heat exchange relationship with the corresponding heat exchange fluid supply 70C, 72C, 74C according to the process heat system 80, 82, 84 associated with the phase change heat exchanger 70, 72, 74. For example, a solar panel as the secondary thermal energy system 92 has a thermal energy supply 96 compatible with the heat exchange relationship of phase change heat exchanger 70. The phase change heat exchanger 70 has a heat exchange fluid 70C generating an operative thermal energy for electricity generation as the process heat system 80. The temperature is relatively low, and the thermal energy supply 96 cannot supply any high temperature heat for hydrogen production, as associated with the phase change heat exchanger 72 for HTSE as process heat system 82. The thermal energy supply 96 can still be useful and incorporated into the power plant system 10 for the process heat system 80 or to be used as topping heat for another process heat system 82, 84. The phase change heat exchanger 70 corresponding to the secondary thermal energy system 92 remains in a fluid connection with a corresponding molten salt portion 60 of the molten salt supply 22 in the respective gradient zone 50 of the thermocline unit 30.

This alternative embodiment addresses the alternative energy sources of a wind power generator 90 and a solar power generator 92. The method of using the power plant system 10 addresses the particular compatibility with inconsistent thermal energy, typical of alternative energy sources. Known dips in thermal energy due to night time or still winds diminish the reliability of alternative energy sources. Even if cleaner for the environment, the lack of reliability prevents wind and solar power from widespread adoption of these technologies. The low levels of thermal energy during these dips are not useful for process heat systems 80, 82, 84. In the method of the present invention, those low levels can become useful as a contributor to the power plant system 10 of the present invention. Thermal energy that was previously wasted can now be used for process heat systems 80, 82, 84 at all times.

The power plant system of the present invention accommodates the capacity of thermal energy from a molten salt reactor assembly, in particular, an assembly with an integral molten salt reactor (IMSR). These reactors generate such large quantities of thermal energy at such high temperatures that conventional heat storage and heat conversion devices are unable to efficiently and effectively utilize the thermal energy being generated. The power plant system of the present invention includes a thermocline unit with zone outlets and gradient zones to efficiently store the molten salt supply in molten salt portions. Thus, the present invention has the storage capacity of a thermocline without reducing the utility of the thermal energy. The thermal energy stored in a thermocline is no longer trapped in the barely useful temperature differential of conventional thermoclines. The higher temperatures generated by the IMSR are no longer wasted, when thermal energy is stored in the power plant system of the present invention.

The present invention also includes phase change heat exchangers corresponding to each gradient zone and respective molten salt portion. The operative thermal energy supply is now available at different thermal energy levels, depending on demand of the downstream process heat systems. The high heat of the molten salt supply from the molten salt reactor assembly with an IMSR can now be utilized for high heat functions, like hydrogen production, while also being stored and while also being used for lower heat functions, like electricity generation. There is less waste thermal energy.

The power plant system of the present invention delivers a heat exchange fluid supply to a process heat system for an operative thermal energy supply. Relative to the raw thermal energy from the molten salt supply directly from the assembly with an IMSR, the operative thermal energy supply is more efficient and more compatible with the process heat system. A sledgehammer is not necessary to press a thumbtack into a corkboard, even though a sledgehammer will be able to accomplish the task. In the same way, the molten salt supply with conventional thermal storage and conversion is the sledgehammer. The present invention is a system and method to use the molten salt supply for different process heat systems, even if those process heat systems do not require the high heat and large capacity of the molten salt supply.

Furthermore, the power plant system includes phase change heat exchangers cooperative with each other and a respective process heat system. This feature allows the molten salt supply to be utilized for a single process heat system or more than one process heat system, even when those process heat systems have different thermal energy demands. When there is a high demand on one process heat system, such as a high demand for electricity generation, the phase change heat exchangers are cooperative to direct the thermal energy from the molten salt supply direct from the assembly with an IMSR to a single phase change heat exchanger corresponding to the one process heat system. The power plant system still can generate only the operative thermal energy supply for the process heat system, instead of more than one operative thermal energy supplies. The one operative thermal energy supply remains more efficient than the raw thermal energy of the molten salt supply directly from the assembly with the IMSR.

The cooperation of the phase change heat exchangers also enables the power plant system to run continuously. The molten salt portions flow continuously through the thermocline unit into gradient zones so that the power plant system is responsive to immediate energy demands of a particular process heat system. Instead of ramping up a conventional heat exchanger to gather more thermal energy from the molten salt supply, the phase change heat exchangers can be adjusted to direct more thermal energy to the desired phase change heat exchanger already working. The thermal stress is reduced on the components of the power plant system. A conventional heat exchanger is not blasted by the molten salt supply at the first temperature over and over again, and there is no cooling period for the heat exchange fluid in that conventional heat exchanger. The molten salt supply is flowing continuously through the thermocline unit, and in some cases, the phase change heat exchangers themselves.

There are dynamic changes in thermal energy supply and thermal energy demands. Thermal energy supply can spike, such as a daybreak with sun on a solar panel. This influx of thermal energy supply from a secondary thermal energy system can now be incorporated into a stable and continuous system with a flowing molten salt supply. The sudden influx of thermal energy supply does not require a "heating up" period or any dramatic reaction in a phase change heat exchanger to suddenly change phases. The thermal energy supply can now be incorporated without inducing the thermal stress to components of the system. Similarly, thermal energy demands can be accommodated. A steel manufacturing factory coming online in the morning will suddenly draw a large amount of electric power. Instead of requiring a large and dramatic ramping up of a phase change heat exchanger, the present power plant system can redirect the heat exchange relationship to the operative thermal energy supply to the electric generator as the process heat system in order to account for this new draw on the operative thermal energy supply needed for the electricity generator as the process heat system. The molten salt supply does not have to be suddenly pumped faster or more dangerously. The molten salt portions at the temperatures higher than needed for the electricity generator are already stratified in the thermocline unit for useable thermal energy that can be directed to the phase change heat exchanger corresponding to the electricity generator. The heat exchange fluid supply does not have to be more violent or stressful on the physical components of the phase change heat exchanger. The heat exchange fluid supply Depending on the heat exchange fluid supplies, the molten salt from the assembly with an IMSR may loop through the thermocline unit to the phase change heat exchangers and then recycle back through the return line after the thermal energy has been released. The thermal energy can be passed to a separate heat exchange fluid supply in the phase change heat exchanger to perform the work of the process heat system. No nuclear molten salt leaves the molten salt reactor assembly, but the thermal energy is safely and efficiently transferred to heat exchange fluid supplies corresponding to process heat systems. Different operative thermal energy supplies are maintained from one molten salt supply. There may be additional heat exchangers before reaching the process heat systems as well.

The foregoing disclosure and description of the invention is illustrative and explanatory thereof. Various changes in the details of the illustrated structures, construction and method can be made without departing from the true spirit of the invention.

We claim:

1. A method for thermal energy, the method comprising the steps of:
    generating a molten salt supply at a first temperature from a molten salt reactor being comprised of a molten salt outlet and a salt return line;
    flowing said molten salt supply to a thermocline unit being in fluid connection with said molten salt reactor, wherein said thermocline unit comprises:
        an insulated tank with a top end and a bottom end;
        an initial inlet in fluid connection with said molten salt outlet of said molten salt reactor; and
        a plurality of gradient zones within said insulated tank, said gradient zones being stacked from said bottom end to said top end;
    stratifying said molten salt supply within said thermocline unit so as to form a plurality of molten salt portions, each molten salt portion having a portion temperature and a corresponding gradient zone, wherein each portion temperature of a corresponding gradient zone is higher than a respective portion temperature of the respective gradient zone stacked under said corresponding gradient zone;
    flowing said molten salt portions in respective gradient zones to a respective phase change heat exchanger of a plurality of phase change heat exchangers, wherein each phase change heat exchanger is in fluid connection with an adjacent phase change heat exchanger and said molten salt reactor;
    generating at least one operative thermal energy supply from said plurality of phase change heat exchangers and said molten salt portions; and
    delivering said at least one operative thermal energy supply to at least one process heat system in fluid connection with a corresponding phase change heat exchanger of said plurality of phase change heat exchangers.

2. The method for thermal energy, according to claim 1, wherein the step of flowing said molten salt portions in respective gradient zones to a plurality of phase change heat exchangers, and the step of generating at least one operative thermal energy supply from said plurality of phase change heat exchangers and said molten salt portions are continuous, and
    wherein said at least one process heat system adjusts respective rates of the step of flowing said molten salt portions and the step of generating at least one operative thermal energy supply.

3. The method for thermal energy, according to claim 1, wherein the step of generating at least one operative thermal energy supply comprises:
    generating a first operative thermal energy supply from one of said plurality of phase change heat exchangers and a corresponding molten salt portion; and
    generating a second operative thermal energy supply from another of said plurality of phase change heat exchangers and another corresponding molten salt portion.

4. The method for thermal energy, according to claim 3, wherein the step of delivering comprises:
    delivering said first operative thermal energy supply to a first process heat system in fluid connection with said one of said plurality of phase change heat exchangers; and
    delivering said second operative thermal energy supply to a second process heat system in fluid connection with said another of said plurality of phase change heat exchangers.

5. The method for thermal energy, according to claim 3, wherein the step of delivering comprises:
    delivering said first operative thermal energy supply to said another of said plurality of phase change heat exchangers, and
    wherein the step of generating a second operative thermal energy supply comprises:
        generating a second operative thermal energy supply from another of said plurality of phase change heat exchangers and another corresponding molten salt portion and from said first operative thermal energy supply.

6. The method for thermal energy, according to claim 1, further comprising the step of:
    supplying a thermal energy supply from a secondary thermal energy system at a secondary temperature,
    wherein said secondary thermal energy supply is in heat exchange relationship with at least one of said plurality of phase change heat exchangers corresponding to said secondary temperature, said secondary thermal energy supply being in heat exchange relationship with a corresponding heat exchange fluid supply.

7. The method for thermal energy, according to claim 6, wherein the step of generating at least one operative thermal energy supply comprises:

exchanging heat from said secondary thermal energy supply of said secondary thermal energy system with said corresponding heat exchange fluid supply.

\* \* \* \* \*